United States Patent
Hochi

(10) Patent No.: US 7,405,256 B2
(45) Date of Patent: Jul. 29, 2008

(54) RUN FLAT TIRE

(75) Inventor: Kazuo Hochi, Kobe (JP)

(73) Assignee: Sumitomo Rubber Industries, Ltd., Kobe-Shi, Hyogen-Ken (JP)

( * ) Notice: Subject to any disclaimer, the term of this patent is extended or adjusted under 35 U.S.C. 154(b) by 28 days.

(21) Appl. No.: 11/403,865

(22) Filed: Apr. 14, 2006

(65) Prior Publication Data

US 2006/0247365 A1    Nov. 2, 2006

(30) Foreign Application Priority Data

May 2, 2005    (JP) .............................. 2005-133922

(51) Int. Cl.
*C08L 9/06*    (2006.01)
(52) U.S. Cl. ................... 524/571; 524/526; 524/525; 524/572; 524/723; 524/742; 524/714; 524/493
(58) Field of Classification Search ................ 524/526, 524/525, 571, 572, 723, 742, 714, 493
See application file for complete search history.

(56) References Cited

U.S. PATENT DOCUMENTS

2001/0051685 A1* 12/2001 Obrecht et al. ............... 524/526

FOREIGN PATENT DOCUMENTS

| EP | 1 149 868 A2 | 10/2001 |
|---|---|---|
| EP | 1 297 974 A1 | 4/2003 |
| JP | 2001-213999 A | 8/2001 |
| JP | 2002-103912 A | 4/2002 |
| JP | 2002-155169 A | 5/2002 |
| JP | 2003-292685 A | 10/2003 |
| JP | 2004168903 * | 6/2004 |

* cited by examiner

*Primary Examiner*—Ling-Siu Choi
(74) *Attorney, Agent, or Firm*—Birch Stewart Kolasch & Birch, LLP

(57) ABSTRACT

There is provided a run flat tire having a side reinforcing layer in which low exothermic property and high hardness are compatible and durability is improved. A rubber composition containing 10 to 100 parts by weight of carbon black with a nitrogen adsorption specific area of 30 to 100 $m^2/g$ and a dibutyl phthalate oil absorption amount of 50 ml/100 g or more and 2 parts by weight or more of sulfur or a sulfur compound, based on 100 parts by weight of a rubber component containing 10 to 50% by weight of a conjugated diolefin polymer or a copolymer of a diolefin and an aromatic vinyl compound having a primary amino group and an alkoxysilyl group and having a glass transition point of −30° C. or less in which a bifunctional or more monomer is copolymerized in a polymer chain and/or at least a portion of a (co)polymer chain is coupled with a bifunctional or more coupling agent, and a run flat tire having a side reinforcing layer comprising the rubber composition.

5 Claims, 1 Drawing Sheet

RUN FLAT TIRE

BACKGROUND OF THE INVENTION

The present invention relates to a run flat tire in which the low exothermic property and high hardness of a side reinforcing layer are compatible and durability is improved.

At present, a run flat tire having a side reinforcing layer with high hardness which is arranged at the inside of a side wall portion is practically used and even if a car becomes in a state in which air pressure is lost by blowout, it has come to be able to run at a distance to a certain degree. Thereby, necessity to always provide a spare tire is extinguished and the weight saving of weight in the whole vehicle can be expected.

However, since the run flat tires support the weight of a car with a side reinforcing layer running at low inner pressure, there has been a problem that they are thermally deteriorated by repeating great deformation during running. Accordingly, speed and running distance were limited for the running of run flat tires while running at low inner pressure.

Although there is a method of suppressing deformation by thickening the side reinforcing layer and preventing fracture by deformation, as an effective method of improving the durability of run flat tires, there have been problems in that the weight of tires is enlarged which is contrary to the weight saving being the original purpose of run flat tires.

Further, there is also known a method of hardening a rubber for reinforcement by increasing a filler for reinforcement such as carbon black and suppressing the deformation of a side reinforcing layer, load for steps such as kneading and extrusion is great and heat generation is large in physical property after vulcanization, the improvement of the durability of run flat tires is not expected so much.

In the Japanese Unexamined Patent Publication No. 2002-155169, there is disclosed a low exothermic method of heightening the cure density of a side reinforcing layer by increasing the compounding amount of a vulcanizing agent and a vulcanization accelerator to the side reinforcing layer without increasing the amount of a filler for reinforcement, such as carbon black, and lessening the deformation quantity at the running of run flat tires at low inner pressure, but there have been problems that the elongation of the side reinforcing layer is lowered and strength at break is lowered.

SUMMARY OF THE INVENTION

It is the object of the present invention to provide a run flat tire having a side reinforcing layer in which low exothermic property and high hardness are compatible and durability is improved.

The present invention relates to a rubber composition containing 10 to 100 parts by weight of carbon black with a nitrogen adsorption specific area of 30 to 100 $m^2/g$ and a dibutyl phthalate oil absorption amount of 50 ml/100 g or more and 2 parts by weight or more of sulfur or a sulfur compound, based on 100 parts by weight of a rubber component containing 10 to 50% by weight of a conjugated diolefin polymer or a copolymer of a diolefin and an aromatic vinyl compound having a primary amino group and an alkoxysilyl group and having a glass transition point of −30° C. or less in which a bifunctional or more monomer is copolymerized in a polymer chain and/or at least a portion of a (co)polymer chain is coupled with a bifunctional or more coupling agent.

The rubber composition contains further preferably 5 to 120 parts by weight of lamellar natural ore based on 100 parts by weight of the rubber component.

The present invention relates to a run flat tire having a side reinforcing layer comprising the rubber composition.

DETAILED DESCRIPTION

Figure 1:
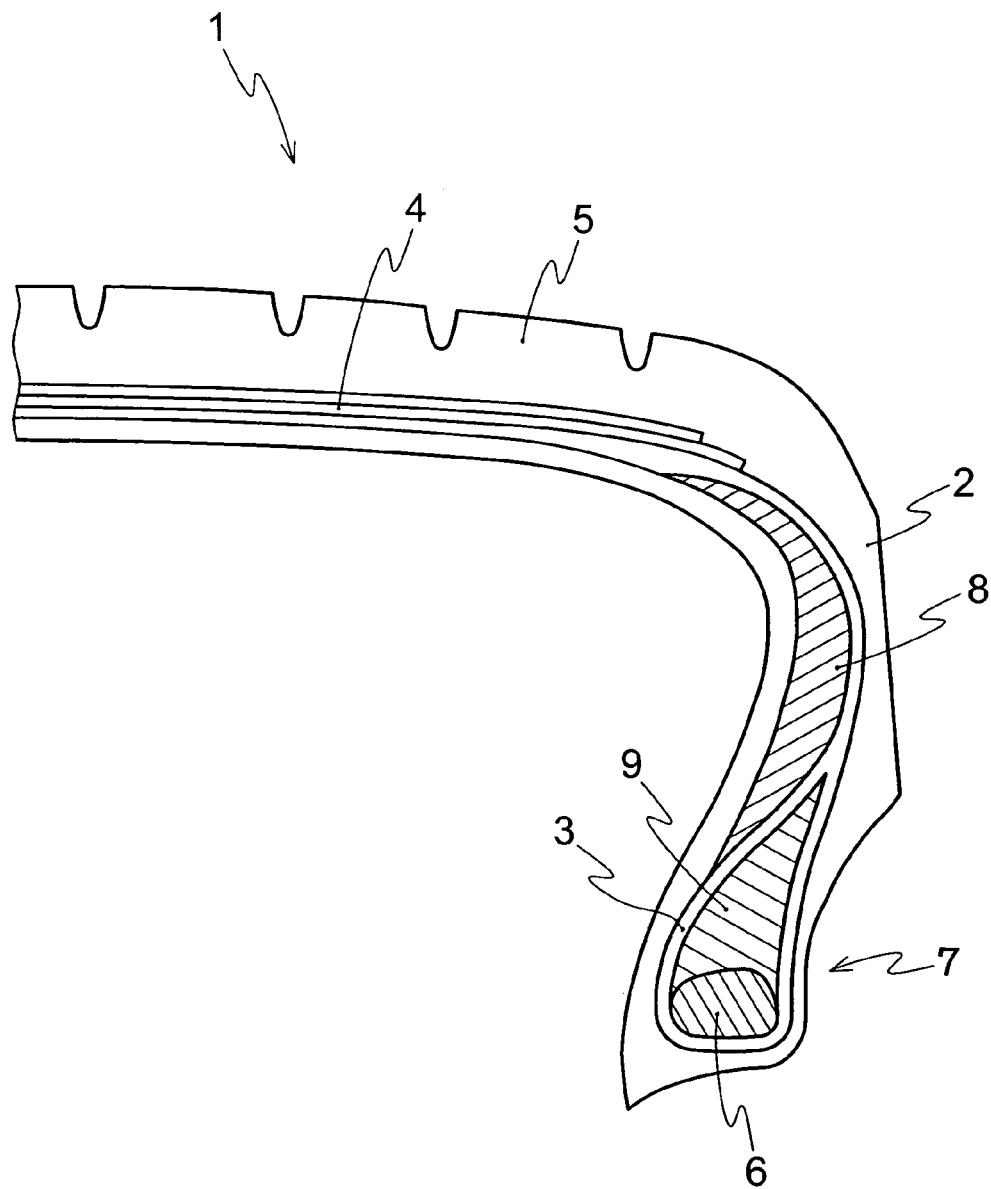
FIG. 1 is the right half of the sectional view of the run flat tire in one embodiment of the present invention

The rubber composition of the present invention comprises a rubber component, carbon black and sulfur or a sulfur compound.

The rubber component contains a conjugated diolefin polymer or a copolymer (copolymer 1) of a diolefin and an aromatic vinyl compound.

Specific examples of the conjugated diolefins include 1,3-butadiene, isoprene, 2,3-dimethyl-1,3-butadiene, 2-chloro-1,3-butadiene, 1,3-pentadiene and a mixture thereof.

Specific examples of the aromatic vinyl compound include styrene, 2-methylstyrene, 3-methylstyrene, 4-methylstyrene, α-methylstyrene, 2,4-dimethylstyrene, 2,4-diisopropylstyrene, 4-tert-butylstyrene, tert-butoxystyrene, vinyl benzyl dimethylamine, (4-vinylbenzyl) dimethylaminoethyl ether, N,N-dimethylaminoethylstyrene, vinyl pyridine and a mixture thereof. Among these, the aromatic vinyl compound is preferably styrene.

The conjugated diolefin polymer or copolymer 1 has a primary amino group ($-NH_2$) and an alkoxysilyl group.

The primary amino group of the conjugated diolefin polymer or copolymer 1 may be bound with the terminal of polymerization initiation, the terminal of polymerization termination, the main chain of a polymer and a side chain, but it is preferable from the viewpoint of suppressing energy loss from the terminal of a polymer and improving the property of hysteresis loss that the primary amino group is introduced into the terminal of polymerization initiation or the terminal of polymerization termination.

The content of the primary amino group of the conjugated diolefin polymer or copolymer 1 is preferably 0.5 mmol/kg or more, more preferably 1 mmol/kg or more, and further preferably 2 mmol/kg or more. When the content is less than 0.5 mmol/kg or more, the effect of introducing the primary amino group is hardly expressed, and the property of hysteresis loss, abrasion resistance and fracture property of the rubber composition obtained tend to be not adequately improved. Further, the content of the primary amino group of the conjugated diolefin polymer or copolymer 1 is preferably 200 mmol/kg or less, more preferably 100 mmol/kg or less, and further preferably 50 mmol/kg or less. When the content exceeds 200 mmol/kg, interaction with reinforcing agents such as carbon black and silica becomes great and compounding viscosity is increased to deteriorate processability.

The calculation method of the content of the primary amino group is shown.

Firstly, after the conjugated diolefin polymer or copolymer 1 is dissolved in toluene, it is precipitated in a large quantity of methanol, and thereby a compound containing an amino group which is not bound with the conjugated diolefin polymer or copolymer 1 is separated and then dried. Then, the content of the total amino groups is determined according to the "total amine value test method" described in JIS K7237 using the conjugated diolefin polymer or copolymer 1 as a sample. Successively, the contents of the secondary and tertiary amino groups are measured by the "acetylacetone blocked method" using the conjugated diolefin polymer or copolymer 1 treated, as a sample. O-nitrotoluene is used as a solvent for dissolving the sample, acetylacetone is added, potentiometric titration is carried out with a perchloric acetic acid solution, the content (mmol) of the primary amino group is determined by subtracting the contents of the secondary and tertiary amino groups from the content of the total amino groups, and the content (mmol/kg) of the primary amino group is determined by dividing it by the weight of polymer used for analysis.

The alkoxysilyl group of the conjugated diolefin polymer or copolymer 1 may be bound with either of the terminal of polymerization initiation, the terminal of polymerization termination, the main chain of a polymer and a side chain, but it is preferable from the viewpoint of suppressing energy loss from the terminal of a polymer and improving the property of hysteresis loss that the primary amino group is introduced into the terminal of polymerization termination.

The alkoxysilyl group includes specifically a dimethoxymethylsilyl group, a diethoxymethylsilyl group, a dibutoxymethylsilyl group, a dipropoxymethylsilyl group and the like.

The content of the alkoxysilyl group of the conjugated diolefin polymer or copolymer 1 is preferably 0.5 mmol/kg or more, more preferably 1 mmol/kg or more, and further preferably 2 mmol/kg or more. When the content is less than 0.5 mmol/kg, the effect of introducing the alkoxysilyl group is hardly expressed. Namely, the property of hysteresis loss, abrasion resistance and fracture property of the rubber composition obtained tend to be not adequately improved. Further, the content of the alkoxysilyl group of the conjugated diolefin polymer or copolymer 1 is preferably 200 mmol/kg or less, more preferably 100 mmol/kg or less and further preferably 50 mmol/kg or less. When the content exceeds 200 mmol/kg, interaction with reinforcing agents such as carbon black and silica becomes too high and compounding viscosity tends to be increased to deteriorate processability. Further, the content of the alkoxysilyl group is determined by infrared spectrum by the absorption quantity of 1160 $cm^4$ originated in a Si—C bond.

In the conjugated diolefin polymer or copolymer 1, a bifunctional or more monomer is copolymerized in the (co) polymer chain, and/or at least a portion of the (co)polymer chain is coupled with a bifunctional or more coupling agent.

The bifunctional or more monomer includes divinylbenzene, diisopropenylbenzene, trivinylbenzene and the like. The amount of the bifunctional or more monomer used is preferably 5% by weight or less and more preferably 0.1% by weight or less. When it exceeds 5% by weight, the processability and physical properties of the rubber composition obtained is occasionally lowered. Further, the amount of the bifunctional or more monomer used is preferably 0.001% by weight or more.

Further, the bifunctional or more coupling agent includes at least one compound selected from a group consisting of (a) an isocyanate compound and/or an isothiocyanate compound, (b) an amide compound and/or an imide compound, (c) a pyridyl substituted ketone compound and/or a pyridyl substituted vinyl compound, (d) a silicone compound, (e) an ester compound, (f) a ketone compound and (g) a tin compound, and (g) a tin compound is preferable.

Among these compounds, the specific example of the isocyanate compound and/or isothiocyanate compound being the component (a) includes preferably 2,4-tolylene diisocyanate, 2,6-tolylene diisocyanate, diphenylmethane diisocyanate, polymeric type diphenylmethane diisocyanate (C-MDI), isophorone diisocyanate, hexamethylene diisocyanate, 1,3,5-benzene triisocyanate, phenyl-1,4-diisothiocyanate and the like. The specific example of the amide compound and/or imide compound being the component (b) includes preferably amide compounds such as succinamide, phthalamide, N,N,N',N'-tetramethylphthalamide, oxamide and N,N,N',N'-tetramethyloxamide and imide compounds such as succinimide, N-methylsuccinimide, maleimide, N-methylmaleimide, phthalimide and N-methylphthalimide.

The specific example of the pyridyl substituted ketone compound or pyridyl substituted vinyl compound being the component (c) includes preferably dibenzoylpyridine, diacetylpyridine, divinylpyridine and the like.

The specific example of the silicone compound being the component (d) includes preferably dibutylsilicon dichloride, methylsilicon trichloride, methylsilicon dichloride, silicon tetrachloride, triethoxymethylsilane, triphenoxymethylsilane, trimethoxysilane, methyltriethoxysilane, 4,5-epoxyheptylmethyldimethoxysilane, bis(triethoxysilylpropyl)tetrasulfide and the like.

The specific example of the ester compound being the component (e) includes preferably diethyl adipate, diethyl malonate, diethyl phthalate, diethyl glutarate, diethyl maleate and the like.

The specific example of the ketone compound being the component (f) includes preferably N,N-dimethyl-1-aminobenzoquinone, N,N,N',N'-tetramethyl-1,3-diaminobenzoquinone, N,N-dimethyl-1-aminoanthraquinone, N,N,N',N'-tetramethyl-1,4-diaminoanthraquinone and the like.

The specific example of the tin compound being the component (g) includes preferably tin tetrachloride, tin tetrabromide, butyltin trichloride, methyltin trichloride, octyltin trichloride, dimethyltin dibromide, dimethyltin dichloride, dioctyltin dichloride, 1,2-bis(trichlorostanyl)ethane, 1,2-bis(methyldichlorostanylethane), 1,4-bis(trichlorostanyl) butane, 1,4-bis(methyldichlorostanyl) butane, ethyltin tristearate, butyltin trisoctanoate, butyltin trisstearate, butyltin trislaurate, dibutyltin bisoctanoate, dibutyltin bisstearate, dibutyltin bislaurate and the like.

Further, when the conjugated diolefin and aromatic vinyl compound are copolymerized using the tin compound (g) as a coupling agent, the anionic polymerization of the conjugated diolefins and aromatic vinyl compound is carried out, and then, it is preferable to add the conjugated diolefins just before carrying out coupling, carry out polymerization and obtain a conjugated diolefins (co)polymerization rubber containing a conjugated diene unit-tin bond chain, when the coupling of the active terminal of polymerization with a bifunctional or more tin compound is carried out. Thus, a rubber superior in rolling frictional resistance property and fracture property is obtained by adding the conjugated diolefin just before coupling to suppress the preparation of the bond chain of the aromatic vinyl compound (styrene) unit with tin.

These coupling agents which are reacted at the active terminal of polymerization can be used alone or 2 or more thereof can be used in combination.

The glass transition point of the conjugated diolefin polymer or copolymer 1 is −30° C. or less, preferably −50° C. or less and more preferably −60° C. or less. When the glass transition point exceeds −30° C., heat generation is enlarged and the run flat property is lowered. Further, the glass transition point of the conjugated diolefin polymer or copolymer 1 means a value calculated in accordance with ASTM D3418.

The weight average molecular weight of the conjugated diolefin polymer or copolymer 1 is preferably 100,000 or more and more preferably 150,000 or more. When the weight average molecular weight is less than 100,000, the fracture property, abrasion resistance and the property of low hysteresis loss of the rubber composition obtained tend to be not adequate. Further, the weight average molecular weight of the conjugated diolefin polymer or copolymer 1 is preferably 2,000,000 or less and more preferably 1,500,000 or less. When the weight average molecular weight exceeds 2,000,000, processability tends to be inferior. Further, the weight average molecular weight was determined by conversion to polystyrene using Gel Permeation Chromatography (GPC) (HLC-8120 GPC manufactured by Tosoh Corporation).

When the copolymer 1 is used, the content of the bound aromatic vinyl compound bound in a copolymer chain is preferably 25% by weight or less and more preferably 15% by weight or less. When the bound aromatic vinyl exceeds 25% by weight, heat generation is enlarged and the run flat property tends to be lowered. Further, when the copolymer 1 is, for example, a styrene-butadiene copolymer, the content of styrene bound in the styrene-butadiene copolymer is determined by 270 MHz $^1$H-NMR.

When the copolymer 1 is used, the content of a vinyl bond (1,2-bond and/or 3,4-bond) in the polymerization unit of the conjugated diolefins is preferably 60% by weight or less, and more preferably 45% by weight or less. When the bound styrene content exceeds 60% by weight, heat generation is enlarged and the run flat property tends to be lowered. Further, when the copolymer 1 is, for example, a styrene-butadiene copolymer, the vinyl content is determined by 270 MHz $^1$H-NMR.

The content of the conjugated diolefin polymer or copolymer 1 in the rubber component is 10% by weight or more, and preferably 20% by weight or more. When the content is less than 10% by weight, the improvement effect of the run flat property by the conjugated diolefin polymer or copolymer 1 is not obtained. Further, the content of the conjugated diolefin polymer or copolymer 1 in the rubber component is 50% by weight or less, and preferably 40% by weight or less. When the content exceeds 50% by weight, strength at break is lowered and the run flat property is lowered.

As the rubber component, it is preferable to use a diene base rubber (SPB-containing diene base rubber) containing syndiotactic 1,2-polybutadiene together with the conjugated diolefin polymer or copolymer 1. As the SPB-containing diene base rubber, for example, a butadiene rubber containing syndiotactic 1,2-polybutadiene such as VCR-303, 412 and 617 manufactured by Ube Industries Ltd, and the like can be used.

As the rubber component, there may be used diene base rubbers such as a natural rubber (NR), butadiene rubber (BR), styrene-butadiene copolymer rubber (SBR), isoprene rubber (IR), acrylonitrile-butadiene copolymer rubber (NBR), chloroprene rubber (CR), styrene-isoprene-butadiene copolymer rubber (SIBR), styrene-isoprene copolymer rubber and isoprene-butadiene copolymer rubber, in addition to the conjugated diolefin polymer or copolymer 1 and the SPB-containing diene base rubber.

As the rubber component, NR is preferably used in combination with the conjugated diolefin polymer or copolymer 1 and the SPB-containing diene base rubber.

The nitrogen adsorption specific surface area ($N_2SA$) of carbon black is 30 $m^2$/g or more, and preferably 35 $m^2$/g or more. When $N_2SA$ is less than 30 $m^2$/g, reinforcing property is inadequate and adequate durability is not obtained. The $N_2SA$ of carbon black is 100 $m^2$/g or less and preferably 60 $m^2$/g or less. When the $N_2SA$ exceeds 100 $m^2$/g, heat generation is enlarged.

The dibutyl phthalate oil absorption amount (DBP oil absorption amount) of carbon black is 50 ml/100 g or more, and preferably 80 ml/100 g or more. When the DBP oil absorption amount is less than 50 ml/100 g, it is difficult to obtain adequate reinforcing property.

The content of carbon black is 10 parts by weight or more based on 100 parts by weight of a rubber component, preferably 20 parts by weight or more, and more preferably 30 parts by weight or more. When the content is less than 10 parts by weight, sufficient strength is not obtained. Further, the content of carbon black is 100 parts by weight or less based on 100 parts by weight of a rubber component, preferably 70 parts by weight or less, and more preferably 60 parts by weight or less. When the content exceeds 100 parts by weight, the kneading and extrusion of the rubber become difficult.

As the vulcanizing agent used in the present invention, sulfur and a sulfur compound are mentioned and among these, it is preferable from the viewpoint of suppressing the surface precipitation of sulfur that insoluble sulfur is used as a vulcanization agent. Further, as the sulfur compound, polymeric polysulfide and morpholine disulfide and the like are mentioned.

The average molecular weight of the insoluble sulfur is preferably 10,000 or more, and more preferably 100,000 or more. When the average molecular weight is less than 10,000, decomposition at low temperature occurs easily and precipitation occurs easily on its surface. Further, the average molecular weight of insoluble sulfur is preferably 500,000 or less, and more preferably 300,000 or less. When the average molecular weight exceeds 500,000, dispersity at low temperature tends to be lowered.

The content (pure sulfur content) of sulfur and the sulfur compounds is 2 parts by weight or more based on 100 parts by weight of the rubber component, and preferably 4 parts by weight or more. When the content is less than 2 parts by weight, hardness is not adequate, bending is enlarged and the run flat property is lowered.

The rubber composition of the present invention further contains preferably lamellar natural ore. The lamellar natural ore includes micas, clay, talc and the like, but micas are preferable in particular.

Examples of the micas are preferably one or more selected from a group consisting of kaolinite, sericite, phlogopite and muscovite, and sericite is more preferable from the viewpoint of balance of hardness with strength at break. One or 2 or more of these may be used in combination.

The aspect ratio (a ratio of the maximum diameter to thickness) of the lamellar natural ore is preferably 3 or more, more preferably 5 or more, and further preferably 10 or more. When the aspect ratio of the lamellar natural ore is less than 3, adequate rubber hardness tends to be not obtained. Further, the aspect ratio of the lamellar natural ore is preferably 30 or less, and more preferably 20 or less. When the aspect ratio is larger than 30, the dispersion of the lamellar natural ore to a rubber tends to be lowered and strength at break tends to be lowered. Further, the aspect ratio is determined as a/b from an average long diameter, a and an average short diameter, b by observing the lamellar natural ore with an electron microscope and measuring a long diameter and a short diameter for arbitrary 50 particles.

The average particle diameter of the lamellar natural ore is preferably 2 μm or more, more preferably 5 μm or more, and further preferably 10 μm or more. When the average particle diameter is less than 2 μm, cost is charged for pulverization and additionally, adequate rubber hardness tends to be not obtained. Further, the average particle diameter of the lamellar natural ore is preferably 30 μm or less, and more preferably 20 μm or less. When the average particle diameter exceeds 30 μm, the lamellar natural ore is the starting point of fracture and flexural fatigue resistance tends to be lowered. Further, the average particle diameter means the average value of the long diameter of the lamellar natural ore.

The content of the lamellar natural ore is preferably 5 parts by weight or more based on 100 parts by weight of the rubber component, and more preferably 10 parts by weight or more. When the content is less than 5 parts by weight, effect obtained by containing the lamellar natural ore tends to be not sufficiently obtained. Further, the content of the lamellar natural ore is preferably 120 parts by weight or less, and more preferably 80 parts by weight or less. When the content exceeds 120 parts by weight, the dispersion of the lamellar natural ore for a rubber is difficult and further, heat tends to be easily generated.

Further, a silane coupling agent is preferably added to the rubber composition of the present invention in combination with the lamellar natural ore.

Examples of the silane coupling agent include bis(3-triethoxysilylpropyl)tetrasulfide, bis(3-trimethoxysilylpropyl) tetrasulfide, bis(2-triethoxysilylpropyl)tetrasulfide, 3-mercaptopropyltriethoxysilane, 2-mercaptoethyltrimethoxysilane and the like. These can be used alone respectively or can be used by arbitrary combination.

The compounding amount of the silane coupling agent is preferably 2 parts by weight or more based on 100 parts by weight of lamellar natural ore, and more preferably 4 parts by weight or more. When the content is less than 2 parts by weight, effect of compounding the silane coupling agent tends to be not obtained. Further, the compounding amount of the silane coupling agent is preferably 20 parts by weight or less based on 100 parts by weight of lamellar natural ore, and more preferably 15 parts by weight or less. When the amount exceeds 20 parts by weight, the effect obtained tends to be not adequately obtained even though it costs high.

The rubber composition of the present invention may further contain zinc oxide, wax, stearic acid, oil, an antioxidant, a vulcanization accelerator, which are usually used for tire compounding.

Compounds used for the vulcanization accelerator include various kinds, but among these, a sulfenamide base vulcanization accelerator is the most often used as a delay base vulcanization accelerator, because scorch occurs hardly in production process and vulcanization property is superior. Further, since rubber compounding which uses the sulfenamide base vulcanization accelerator is also low in exothermic property for deformation by external force in rubber physical properties after vulcanization, effect for the durability improvement of the run flat tire being the maximum purpose in the present invention is great.

The example of sulfenamide base vulcanization accelerator includes TBBS (N-tert-butyl-2-benzothiazolylsulfenamide), CBS (N-cyclohexyl-2-benzothiazolylsulfenamide), DZ (N,N'-dicyclohexyl-2-benzothiazolylsulfenamide) and the like. As other vulcanization accelerator, for example, MBT (mercaptobenzothiazole), MBTS (dibenzothiazyldisulfide), DPG (diphenylguanidine) and the like can be used.

It is preferable that the loss elastic modulus (E") and complex elastic modulus (E*) of the rubber composition of the present invention satisfy the formula describe below.

$$E''/(E^*)^2 \leq 7.0 \times 10^{-9} \, Pa^{-1}$$

When $E''/(E^*)^2$ is larger than $7.0 \times 10^{-9} \, Pa^{-1}$, exothermic heat by deformation of the tire is enlarged at running at low inner pressure, and the thermal deterioration of a rubber is accelerated and it tends to be broken.

The tensile strength at break ($T_B$) of the rubber composition in the present invention is preferably 10 MPa or more, and more preferably 12 MPa or more. When $T_B$ is less than 10 MPa, the side reinforcing layer obtained from the rubber composition is bent by the load of a vehicle at running by the run flat tires and performance as the run flat tires tends to be remarkably insufficient.

The rubber composition of the present invention is preferably used as the side reinforcing layer of the run flat tire. Hereat, the side reinforcing layer means a lining strip layer which is disposed at the inside of the side-wall portion of the run flat tire. A vehicle can be supported even in a state in which air pressure is lost, by the existence of the side reinforcing layer in the run flat tire and superior run flat durability can be imparted.

FIG. 1 shows the side reinforcing layer 8. Numeral 1 shows a tire, 2 a sidewall part, 3 carcass ply, 4 a belt layer, 5 a tread, 6 bead core, 7 a bead part, 8 side reinforcing layer, and 9 bead apex, respectively. As shown in FIG. 1, the side reinforcing layer 8 is disposed over from the bead portion 7 to a shoulder portion in contact with the inside of a tire carcass ply 3 and disposed in a falcate shape wherein thickness is gradually reduced to a both end direction. Further, the side reinforcing layer is disposed in double layers over from the bead portion to the tread portion edge between the main body portion of carcass ply and its folding portion, or between a plural number of carcasses or reinforcing plies.

The run flat tire of the present invention has the side reinforcing layer comprising the rubber composition.

EXAMPLES

The present invention is specifically illustrated based on Examples, but is not limited to only these.

Various chemicals used in Examples are described below.

NR: RSS#3

BR: VCR412 manufactured by Ube Industries Ltd. (the content of syndiotactic 1,2-polybutadiene is 12% by weight).

SBR 1: Polymer synthesized in the laboratory (a copolymer of styrene with butadiene, the amount of styrene bound: 10% by weight, vinyl content: 40% by weight, weight average molecular weight: 450,000, the content of primary amino group: 5.9 mmol/kg, the content of an alkoxysilyl group (dimethoxymethylsilyl group): 5.6 mmol/kg, glass transition temperature: −60° C., and coupling rate coupled with $SnCl_4$: 36%).

SBR 2: Polymer synthesized in the laboratory (a copolymer of styrene with butadiene, the amount of styrene bound: 21% by weight, vinyl content: 55% by weight, weight average molecular weight: 420,000, the content of primary amino group: 5.8 mmol/kg, the content of an alkoxysilyl group (dimethoxymethylsilyl group): 5.6 mmol/kg, glass transition temperature: −25° C., and coupling rate coupled with $SnCl_4$: 36%).

Carbon black (FEF): DIABLACK E, manufactured by Mitsubishi Chemical Corporation ($N_2SA$ of carbon black: 41 $m^2/g$ and DBP oil absorption amount: 115 ml/100 g).

Sericite: KM-8 manufactured by Nippon Forum Inc. (an aspect ratio of 15 and an average particle diameter of 17 μm)

Stearic acid: Stearic acid, TSUBASKI, manufactured by NOF Corporation

Zinc oxide: Zinc oxide No. 2 manufactured by Mitsui Mining And Smelting Company, Limited.

Antioxidant: ANTIGENE 6C manufactured by Sumitomo Chemical Co., Ltd.

Silane coupling Agent: Si-75 manufactured by Degussa Japan Co.

Insoluble sulfur: MU-CRON OT manufactured by Shikoku Chemicals Corporation

Vulcanization accelerator: NOCCELER NS manufactured by OUCHISHINKO CHEMICAL INDUSTRIAL CO., LTD.

Examples 1 TO 2 AND COMPARATIVE EXAMPLES 1 TO 3

Components other than insoluble sulfur and a vulcanization accelerator were kneaded at 150° C. for 4 minutes according to the compounding content shown in Table 1. Insoluble sulfur and a vulcanization accelerator were added to the kneaded product obtained and the mixture was kneaded at 80° C. for 3 minutes to obtain a rubber composition.

Uncured run flat tires with a size of 245/40ZR18 in which lining strip layers comprising the respective rubber compositions of Example and Comparative Examples were disposed as the side reinforcing layer at the inside of a side-wall were prepared and run flat tires were produced by vulcanization to carry out respective evaluations below.

<Tensile Strength at Break $T_B$>

A sheet with a thickness of 2 mm was cut out from each of the lining strip layers of the run flat tires and the evaluation of tensile strength at break ($T_B$) (MPa) was carried out according to JIS K6251.

<E"/(E*)$^2$>

A sheet with a thickness of 2 mm was cut out from each of the lining strip layers of the run flat tires and the loss elastic modulus E" and complex elastic modulus E* were measured at a measurement temperature of 70° C., an initial strain of 10%, a dynamic strain of ±1% and a frequency of 10 Hz with a viscoelastic spectrometer manufactured by Iwamoto Seisakusyo K.K., to calculate E"/(E*)$^2$.

<Run Flat Performance>

A car ran at a speed of 80 km/hr at inner air pressure of 0 kPa on a drum using the run flat tires and running distances until the tires were broken were compared. Comparative Example 1 was referred to as a basis (100) and respective tires were indicated by exponent. It is indicated that the larger the value is, the more superior the run flat durability is. Each of evaluation results is shown in Table 1.

TABLE 1

|  | Ex. | | Com. Ex. | | |
| --- | --- | --- | --- | --- | --- |
|  | 1 | 2 | 1 | 2 | 3 |
| Amount (parts by weight) | | | | | |
| NR | 60 | 40 | 80 | 25 | 40 |
| BR | 20 | 20 | 20 | 20 | 20 |
| SBR1 | 20 | 40 | 5 | 55 | — |
| SBR2 | — | — | — | — | 40 |
| FEF | 50 | 50 | 50 | 50 | 50 |
| Sericite | 30 | 30 | 30 | 30 | 30 |
| Stearic acid | 2 | 2 | 2 | 2 | 2 |
| Zinc oxide | 3 | 3 | 3 | 3 | 3 |
| Antioxidant | 1 | 1 | 1 | 1 | 1 |
| Silane coupling agent | 3 | 3 | 3 | 3 | 3 |
| Insoluble sulfur | 5 | 5 | 5 | 5 | 5 |
| Vulcanization accelerator | 2 | 2 | 2 | 2 | 2 |
| Evaluation results | | | | | |
| $T_B$ [MPa] | 14.1 | 11.5 | 14.3 | 9.7 | 11.4 |
| E"/(E*)$^2$ [$10^{-9}Pa^{-1}$] | 6.6 | 5.9 | 7.5 | 6.1 | 7.9 |
| Run flat property | 138 | 146 | 100 | 93 | 89 |

According to the present invention, there can be provided a run flat tire in which the low exothermic property and high hardness of the side reinforcing layer are compatible and durability is improved, by using a rubber composition containing a rubber component containing the specific amount of a specific conjugated diolefin polymer or the copolymer of a diolefin and an aromatic vinyl compound, carbon black and sulfur or a sulfur compound, for the side reinforcing layer.

What is claimed is:

1. A rubber composition containing 10 to 100 parts by weight of carbon black with a nitrogen adsorption specific area of 30 to 100 m$^2$/g and a dibutyl phthalate oil absorption amount of 50 ml/100 g or more, 2 parts by weight or more of sulfur or a sulfur compound and 5 to 120 parts by weight of lamellar natural ore based on 100 parts by weight of a rubber component containing 10 to 50% by weight of a conjugated diolefin polymer or a copolymer of a diolefin and an aromatic vinyl compound, having a primary amino group and an alkoxysilyl group and having a glass transition point of −30° C. or less;

wherein a bifunctional or more monomer is copolymerized in a polymer chain and/or at least a portion of a (co) polymer chain is coupled with a bifunctional or more coupling agent.

2. The rubber composition of claim 1, wherein the lamellar natural ore is sericite.

3. The rubber composition of claim 1, wherein said rubber composition further comprises diene rubber comprising syndiotactic 1,2-polybutadiene.

4. The rubber composition of claim 3, wherein the lamellar natural ore is sericite.

5. A run flat tire having a side reinforcing layer comprising the rubber composition according to claim 1.

* * * * *